US011019696B2

(12) United States Patent
Sun et al.

(10) Patent No.: US 11,019,696 B2
(45) Date of Patent: May 25, 2021

(54) METHOD AND APPARATUS FOR OPERATING A SEMICONDUCTOR LIGHT SOURCE

(71) Applicant: Dialog Semiconductor (UK) Limited, London (GB)

(72) Inventors: Junyue Sun, Tianjin (CN); Yufeng Zou, Tianjin (CN); Huibin Cao, Tianjin (CN); Lijie Chen, Tianjin (CN)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/185,405

(22) Filed: Nov. 9, 2018

(65) Prior Publication Data

US 2019/0246467 A1 Aug. 8, 2019

Related U.S. Application Data

(63) Continuation of application No. PCT/CN2018/075747, filed on Feb. 8, 2018.

(51) Int. Cl.
*H05B 45/37* (2020.01)
*H05B 45/10* (2020.01)
*H05B 45/397* (2020.01)
*H05B 45/395* (2020.01)

(52) U.S. Cl.
CPC ............. *H05B 45/37* (2020.01); *H05B 45/10* (2020.01); *H05B 45/395* (2020.01)

(58) Field of Classification Search
CPC ............ H05B 33/0815; H05B 33/0812; H05B 33/0845; H05B 45/397; G05F 1/10; G05F 3/26

See application file for complete search history.

(56) References Cited

U.S. PATENT DOCUMENTS

| 4,647,870 A | * | 3/1987 | Ishii ...................... G05F 3/265 323/315 |
| 9,265,109 B2 | | 2/2016 | Muramatsu et al. |
| 9,497,812 B2 | | 11/2016 | Lee et al. |

(Continued)

FOREIGN PATENT DOCUMENTS

| CN | 104303602 | 1/2015 |
| CN | 204883456 U | * 12/2015 |

(Continued)

OTHER PUBLICATIONS

PCT International Search Report and Written Opinion, Application No. PCT/CN2018/075747, Applicant: Dialog Semiconductor (UK) Limited et al., dated Aug. 1, 2018, 9 pgs.

*Primary Examiner* — Henry Luong
(74) *Attorney, Agent, or Firm* — Saile Ackerman LLC; Stephen B. Ackerman

(57) ABSTRACT

A method and apparatus for operating a semiconductor light source is presented. In particular there is a current regulator for regulating a current flowing through a light emitting diode device. The current regulator includes a first switch for receiving a first current flowing through the semiconductor light source and a control circuit coupled to the first switch and adapted to provide a second current proportional to the first current. The current regulator is adapted to regulate the first current using the second current.

12 Claims, 7 Drawing Sheets

(56) References Cited

U.S. PATENT DOCUMENTS

| | | | | |
|---|---|---|---|---|
| 2004/0196225 A1* | 10/2004 | Shimada | ............... | G09G 3/005 |
| | | | | 345/82 |
| 2008/0174929 A1* | 7/2008 | Shen | ..................... | H05B 45/37 |
| | | | | 361/103 |
| 2008/0231209 A1* | 9/2008 | Shiwaya | ............ | H05B 33/0827 |
| | | | | 315/291 |
| 2013/0249423 A1 | 9/2013 | Su et al. | | |
| 2017/0371363 A1* | 12/2017 | Habu | ................ | H03K 17/6872 |
| 2018/0035507 A1* | 2/2018 | Kumada | ................ | H05B 45/24 |

FOREIGN PATENT DOCUMENTS

| | | |
|---|---|---|
| CN | 105657927 | 6/2016 |
| TW | 1448191 | 8/2014 |

\* cited by examiner

METHOD AND APPARATUS FOR OPERATING A SEMICONDUCTOR LIGHT SOURCE

This is a continuation of PCT/CN2018/075747, filed on Feb. 8, 2018, which is herein incorporated by reference in its entirety, and assigned to a common assignee.

TECHNICAL FIELD

The present disclosure relates to a method and apparatus for operating a semiconductor light source. In particular the present disclosure relates to a current regulator for regulating a current flowing through a light emitting diode device.

BACKGROUND

Semiconductor light sources have many advantages over incandescent light sources. For instance, light emitting diodes LEDs are characterised by a low energy consumption and a relatively long lifetime.

LEDs can be powered with a switching power converter which converts a line voltage into an LED forward bias voltage. Alternatively, an LED device may be powered with a line voltage directly. This later approach is cheaper to implement and is commonly used for low cost applications. However, LEDs operated using a direct line voltage such as an AC input, suffer from light jitter and electromagnetic interferences.

SUMMARY

It is an object of the disclosure to address one or more of the above-mentioned limitations. According to a first aspect of the disclosure, there is provided a current regulator for use with a semiconductor light source, the current regulator comprising a first switch for receiving a first current flowing through the semiconductor light source; and a control circuit coupled to the first switch adapted to provide a second current proportional to the first current; wherein the current regulator is adapted to regulate the first current using the second current.

For example, the semiconductor light source may be a light emitting diode LED device.

Optionally, the second current may be defined by a product of the first current and a constant, wherein the constant is an integer equal or greater than one. For example the second current may be equal to the first current. The second current may be equal to twice the first current.

Optionally, the control circuit comprises a current mirror circuit.

Optionally, the control circuit comprises a comparator coupled to the current mirror circuit via a second switch.

Optionally, the comparator may be an operating amplifier provided with a feedback loop to form a closed-loop amplifier.

Optionally, the comparator may be adapted to compare a feedback value with a control value and to provide a control signal to control the second switch; wherein the feedback value is a function of the second current.

Optionally, the second switch may be coupled to ground via a resistance. The resistance may be a variable resistance.

Optionally, the current regulator comprises a voltage source adapted to provide a control voltage; and wherein the feedback value comprises a voltage across the resistance. For example, the control voltage may be a fixed reference voltage.

Optionally, the current regulator comprises a current generator coupled to the second switch.

Optionally, the current generator is adapted to provide a setting current; wherein the setting current is a function of the resistance. For example, the setting current may be equal to a ratio of the control voltage over the resistance.

Optionally, the current mirror circuit comprises a first current mirror coupled to a second current mirror.

Optionally, the first switch forms part of the first current mirror.

According to a second aspect of the disclosure, there is provided a driver for driving a semiconductor light source, the driver comprising an alternating power source coupled to a rectifier for providing an input voltage to the semiconductor light source, and a current regulator according to the first aspect of the disclosure for regulating a current flowing through the semiconductor light source. For example, the power source may be an AC voltage supply.

According to a third aspect of the disclosure there is provided a method of driving a semiconductor light source wherein a first current flows through the semiconductor light source, the method comprising providing a second current proportional to the first current; and regulating the first current using the second current.

Optionally, the second current may be defined by a product of the first current and a constant, wherein the constant is an integer equal or greater than one.

Optionally, the method comprises providing a feedback value that is function of the second current; comparing the feedback value with a control value; and generating a signal based on the comparison to regulate the first current.

Optionally, the control value may be a control voltage; and the feedback value may be a feedback voltage.

Optionally, the method comprises providing a current mirror circuit for providing the second current.

Optionally, the method comprises providing a comparator coupled to the current mirror circuit.

Optionally, the comparator may be an operating amplifier provided with a feedback loop to form a closed-loop amplifier.

The options described with respect to the first aspect of the disclosure are also common to the second and third aspects of the disclosure.

BRIEF DESCRIPTION OF THE DRAWINGS

The disclosure is described in further detail below by way of example and with reference to the accompanying drawings, in which.

DESCRIPTION

Figure 1:
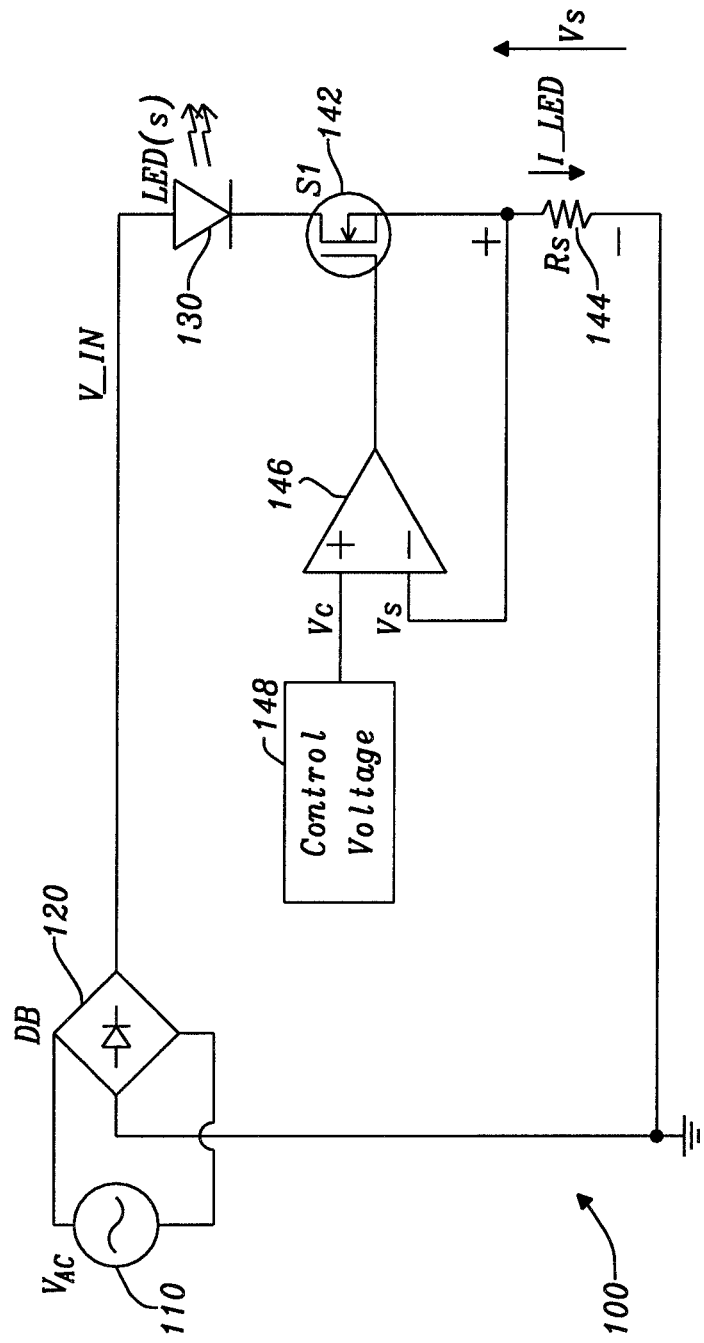
FIG. 1 is a diagram of a conventional LED driver.

FIG. 1 illustrates a conventional driver circuit 100 to operate a light emitting diode (LED) device 130.

The circuit 100 includes an alternating voltage source 110 connected to a bridge rectifier 120. The bridge rectifier 120 has an output for providing a rectified input voltage to the LED device 130. The LED device 130 is connected to ground via a transistor S1 142. The transistor S1 142 is controlled by a circuit formed of an operational amplifier 146, a control voltage circuit 148, and a feedback resistance 144, also referred to as sensing resistance Rs. The transistor S1 142, the operational amplifier 146, the control voltage circuit 148, and the resistance 144 form a current source circuit.

The operational amplifier 146 has a non-inverting input connected to the control voltage circuit 148, an inverting input connected to a first terminal of the resistance 144 and an output connected to the gate terminal of the transistor 142. The transistor 142 has a drain terminal connected to the LED device 130 and a source terminal connected to the first terminal of the resistance 144. The second terminal of the resistance 144 is connected to ground. Therefore, the resistance Rs 144 is connected in series with the LED device 130.

Figure 2:
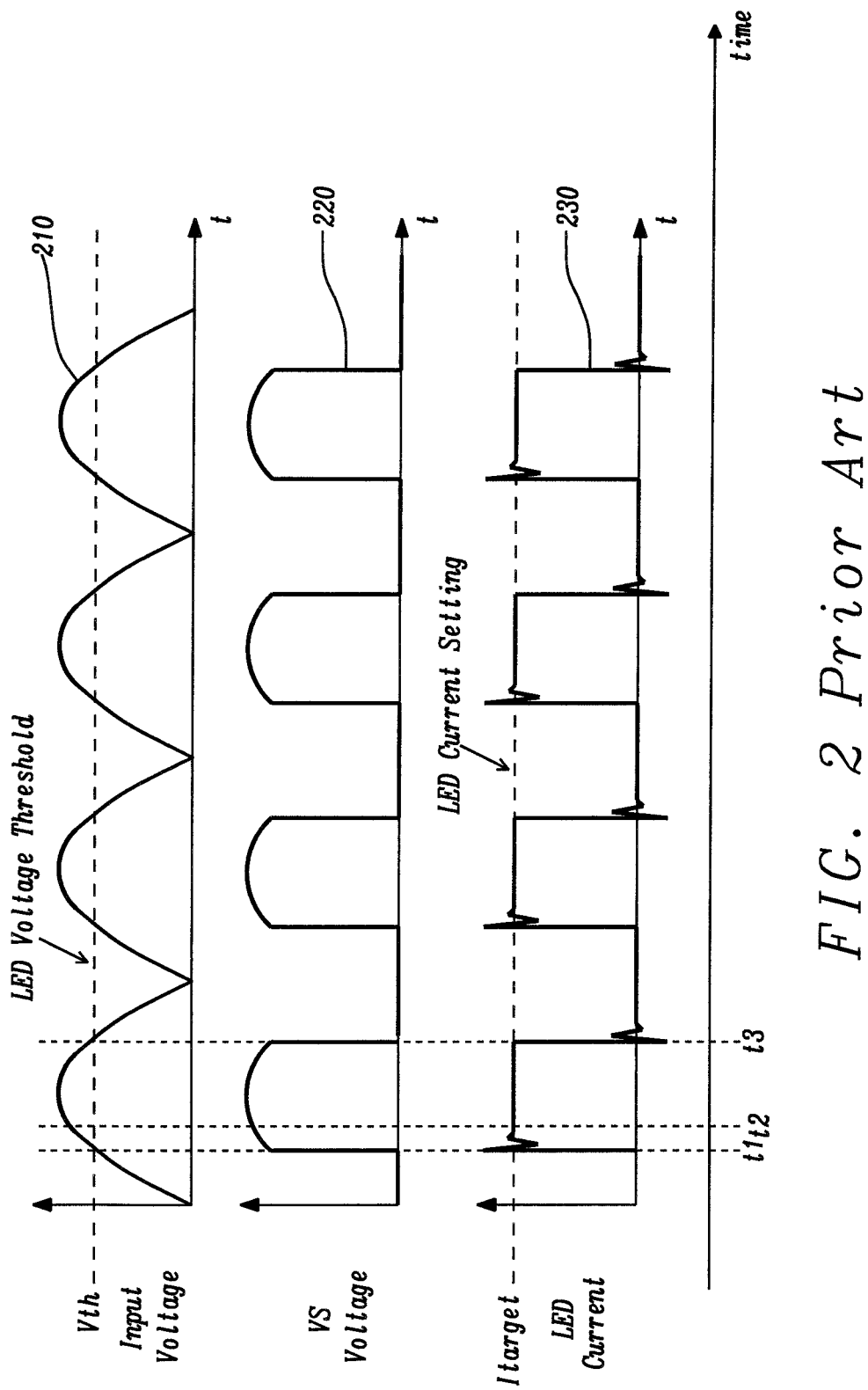
FIG. 2 is a timing diagram illustrating the working of the circuit of FIG. 1.

FIG. 2 is a time chart illustrating the working of the circuit of FIG. 1. FIG. 2 includes the waveforms of the rectified AC input voltage 210, the voltage Vs 220 across the resistance 144, and the current I_LED 230 through the LED device 130.

In operation, the LED current I_LED 230 is regulated by a controlled current source formed by the transistor 142, the operational amplifier 146, and the resistance 144. The voltage Vs is used as a feedback signal.

The control voltage circuit 148 provides a control voltage Vc. The control voltage Vc is based on a target current Itarget. The target current is defined as the ratio of the control voltage over the sensing resistance Rs.

$$I_{target} = \frac{V_C}{R_S} \quad (1)$$

The operational amplifier 146 compares the control voltage Vc with the voltage Vs across the sensing resistor 144, and provides a signal to control the switch S1 142 and regulate the current I_LED.

The LED device 130 has a voltage threshold Vth. If the input voltage is greater than Vth, a current I_LED flows through the LED device. If the input voltage is below or equal to Vth, no current flows through the LED device, and the current I_LED is disabled.

Before time t1, the input voltage 210 is less than Vth. The current I_LED 230 is disabled, and no current is flowing through the feedback resistance Rset 144. This produces a large voltage difference between the non-inverting input (Vc) and the inverting input of the operational amplifier (Vs) 146. For this reason, the operational amplifier 146 is operating in a saturation mode.

At time t1, the input voltage 210 becomes greater than the Vth and the current 230 is enabled. At this point the operational amplifier 146 transits from a saturation mode to a linear mode of operation. During this transition period, the LED current I_LED over-shoots due to a lack of control. This over-shoot is random in nature and causes random LED current variations also referred to as current spikes. Between the times t1 and t2, the current spike decay towards a constant value.

At time t3, the input voltage 210 decreases below Vth. The current I_LED is disabled. For the same reasons as described above the current 230 undershoots, hence generating another current spike.

Therefore, the circuit of FIG. 1 generates random current spikes when the current I_LED 230 is enabled and disabled. Since LED devices respond quickly to current variations, the light output follows closely the LED current waveform. Therefore, the presence of current spikes affects the light output of the LED device, creating light jitters, which are noticeable by the end user. Light jitters are especially noticeable when the LED device is provided with a dimmer switch set to a low light output setting. Additionally, the LED current spikes also increase the amount of radiated and conducted electromagnetic interferences EMI which further limit the use of such circuits.

Figure 3:
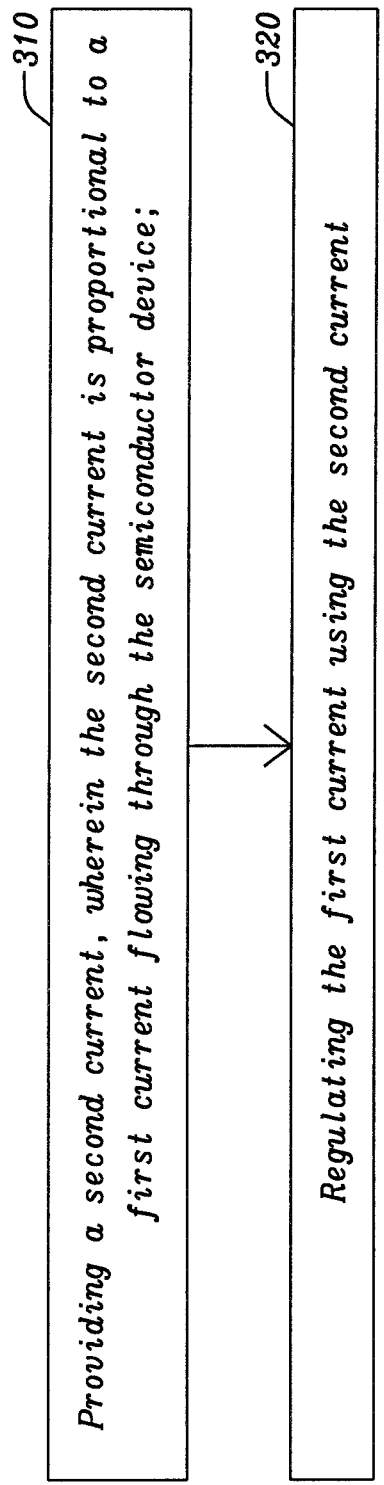
FIG. 3 is a flow chart of a method for driving a semiconductor light source.

FIG. 3 is a flow chart of a method for driving a semiconductor light source. For instance, the semiconductor light source may be an LED device having a first current flowing through it.

At step 310, a second current proportional to the first current is provided. For example, the second current may be equal to the first current. Alternatively, the second current may be equal to N times the first current, in which N is an integer. At step 320, the first current is regulated using the second current.

Figure 4:
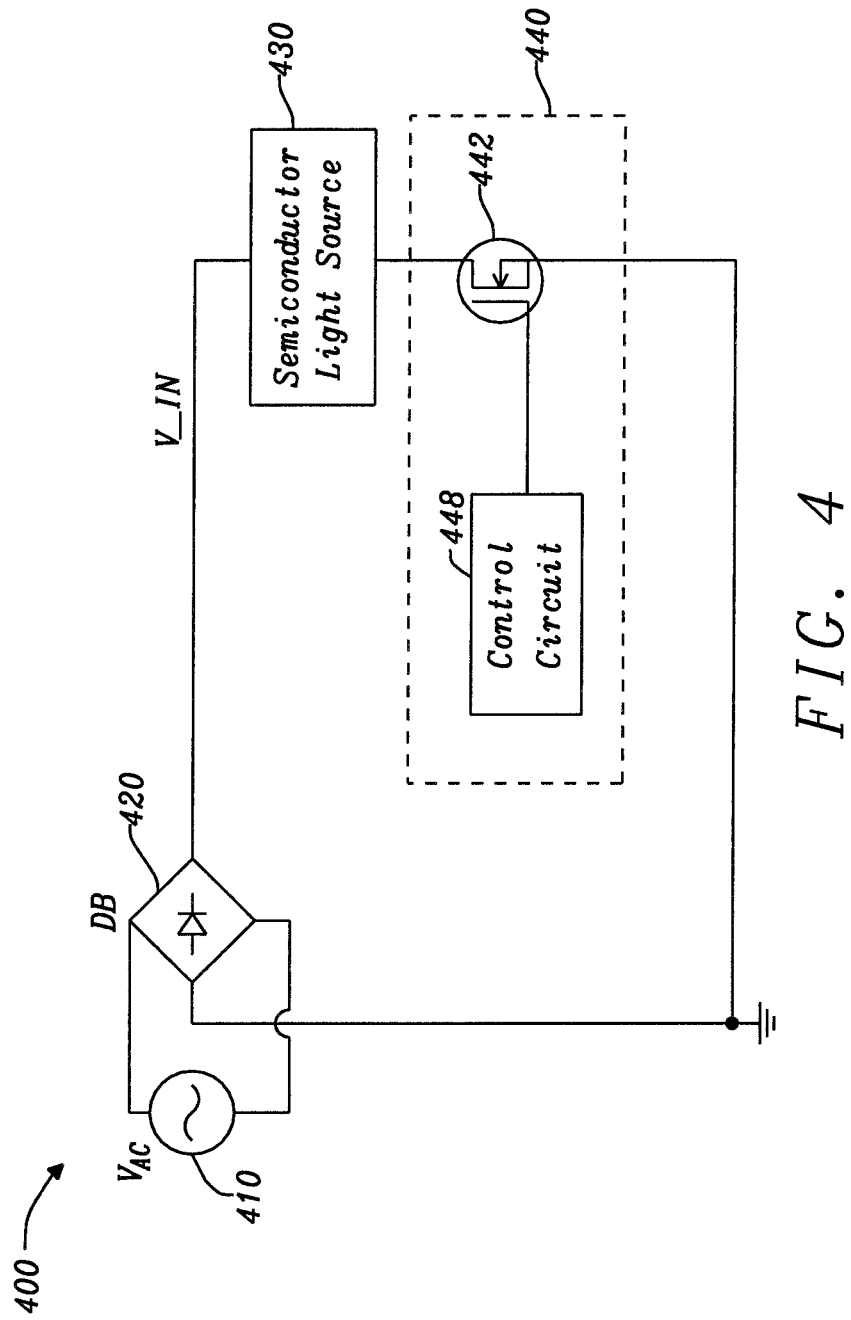
FIG. 4 is a diagram of a driver circuit for implementing the method according to FIG. 3.

FIG. 4 is a diagram of a driver 400 for implementing the method of FIG. 3.

The driver 400 includes an alternating voltage source 410 coupled to a bridge rectifier 420. The bridge rectifier 420 has an output for providing a rectified input voltage to a semiconductor light source 430. The semiconductor light source 430 may be an LED device such as an LED bulb. An LED device may include one or more LEDs. For example, the LED device 430 may be provided by a plurality of LEDs connected in series.

The semiconductor light source 430 has an input coupled to the rectifier 420 and an output coupled to a current regulator 440. The current regulator 440 includes a switch 442 for receiving a first current flowing through the semiconductor light source, and a control circuit 448 coupled to the switch 442. The control circuit 448, may also be referred to as a current setting circuit and is adapted to provide a second current proportional to the first current. The second current may be defined by a product of the first current and a constant N in which N is an integer equal or greater than one. For example, the second current may be a copy of the first current. The driver 400 is advantageous as it permits to tightly regulate the LED current to insure a steady light output.

Figure 5:
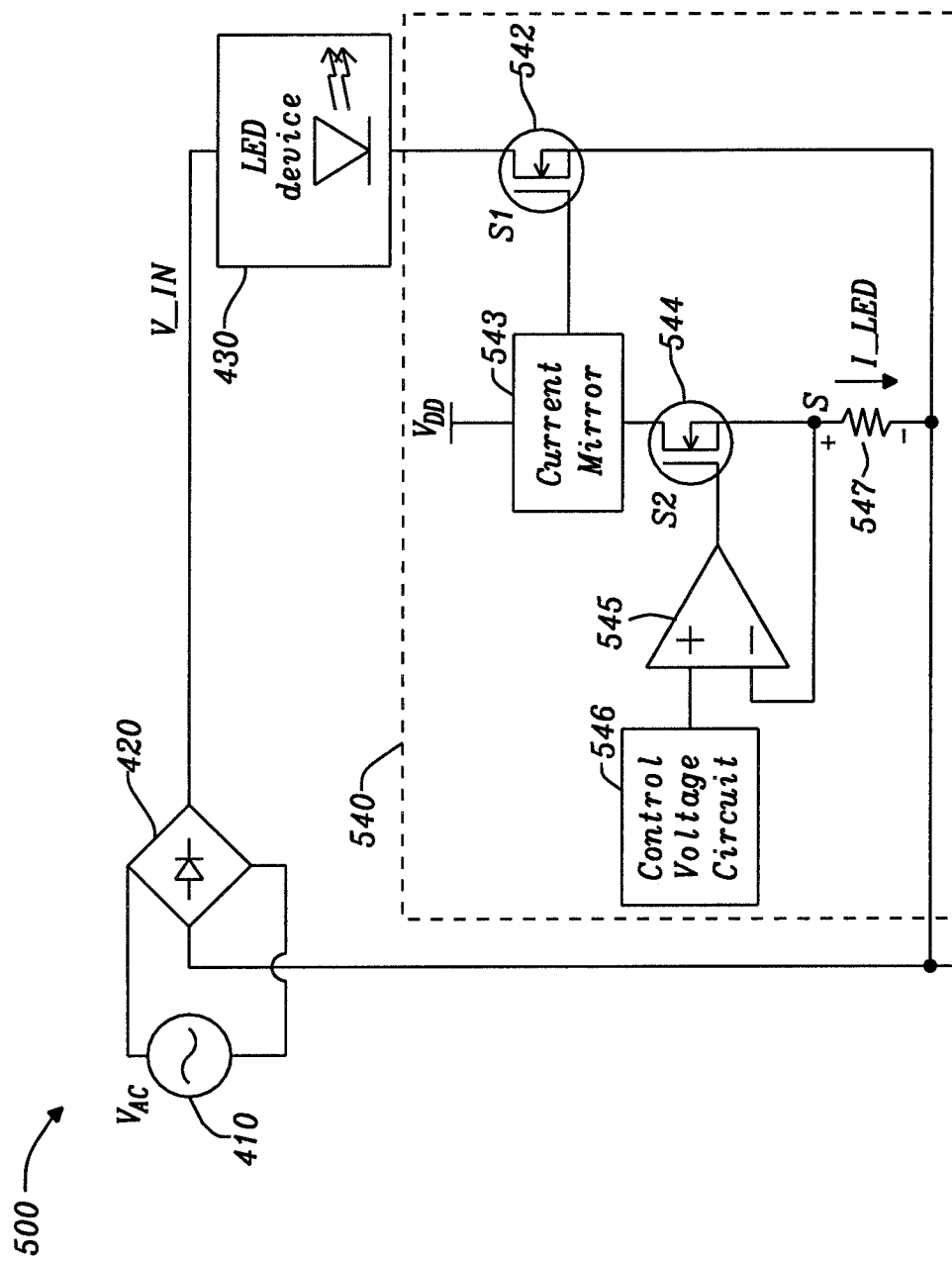
FIG. 5 is an exemplary embodiment of a driver circuit according to FIG. 4.

FIG. 5 illustrates an exemplary embodiment of the circuit of FIG. 4. The circuit 500 of FIG. 5 shares similar components to those illustrated in the circuit 400 of FIG. 4. The same reference numerals have been used to represent corresponding components and their description will not be repeated for sake of brevity.

The current regulator 540 includes a first switch 542, coupled to a controller circuit formed by a current mirror circuit 543, a second switch 544, a comparator 545, a control voltage circuit or voltage source 546, and a resistance 547. The first switch S1 542 has a first terminal, for example a drain terminal coupled to the LED device 430, a second terminal for example a gate terminal coupled to the current mirror circuit 543, and a third terminal, for example a source terminal coupled to the ground. The connection between the first switch S1 and the ground form a path which may be referred to as a slave path.

The comparator 545 has a first input for example a non-inverting input coupled to the control voltage circuit 546, a second input for example an inverting input coupled to a first terminal of the resistance 547 at node S, and an output for providing a control signal. The connection between the node S and the inverting input of the comparator 545 provides a feedback loop. For example, the comparator 545 may be provided by an operating amplifier such as a closed-loop amplifier. The control voltage circuit 546 may be implemented in different fashions. For example, the control voltage circuit 546 may be an analog circuit or a digital circuit.

The second switch S2 544 has a first terminal for example a drain terminal coupled to the current mirror circuit 543, a second terminal for example a gate terminal coupled to the output of the comparator 545 and a third terminal, for example a source terminal coupled to the resistance 547 at node S. The resistor 547 has a first terminal coupled to node S and a second terminal of the coupled to ground.

During operation, the feedback loop of the comparator 545 remains closed. As a result, the comparator 545 operates in a linear mode regardless of the value of the input voltage V_IN. As a result, no current spikes are being generated when the LED current is enabled or disabled.

Figure 6:
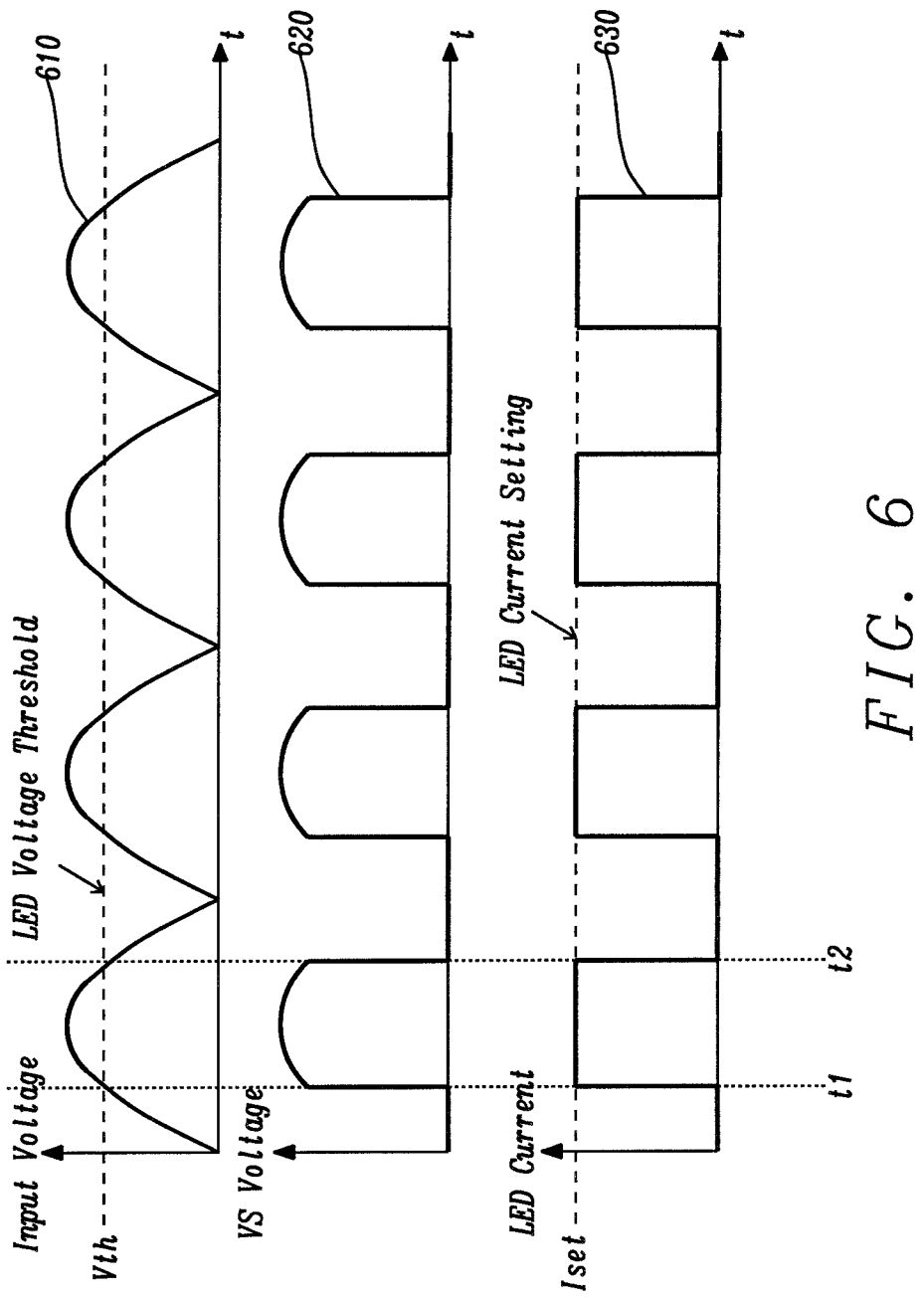
FIG. 6 is a timing diagram illustrating the working of the circuit of FIG. 5.

FIG. 6 is a time chart illustrating the working of the circuit of FIG. 5. FIG. 6 shows the waveforms of the rectified AC input voltage 610, the voltage 620 between the source of the switch S1 542 and ground, and the current I_LED 630 flowing through the semiconductor light source 430.

Before time t1, the input voltage 610 is less than the threshold voltage Vth. The slave path between the first switch S1 and ground does not conduct.

At time t1, the input voltage 610 becomes greater than Vth and the slave path starts conducting. Between the times t1 and t2, the current 630 remains substantially constant about a current value Iset.

At time t2, the input voltage 610 becomes lower than Vth and the current 630 is disabled. The slave path between the first switch S1 and ground does not conduct.

As describes above the current mirror circuit 543, the switch S2 544, the comparator 545, the control voltage circuit 546 and the resistance 547 form a control circuit.

The current flowing through the resistance 547 may be a pre-set current. The pre-set current may correspond to a certain light output of the LED device. For example, the pre-set current may be set by the control circuit. During operation, the loop between the output of the comparator 545 and its negative input remains closed regardless of the value of the input voltage V_IN. In this way, the control circuit is always operating in a linear mode of operation. In other word the difference in voltage between the non-inverting input and the inverting input of the comparator 545 remains small over time.

As a result, no current variation or current spike is being generated at time t1 or t2. Therefore, the circuit 500 eliminates current spikes and permits the emission of a steady light output of the LED device 430.

Figure 7:
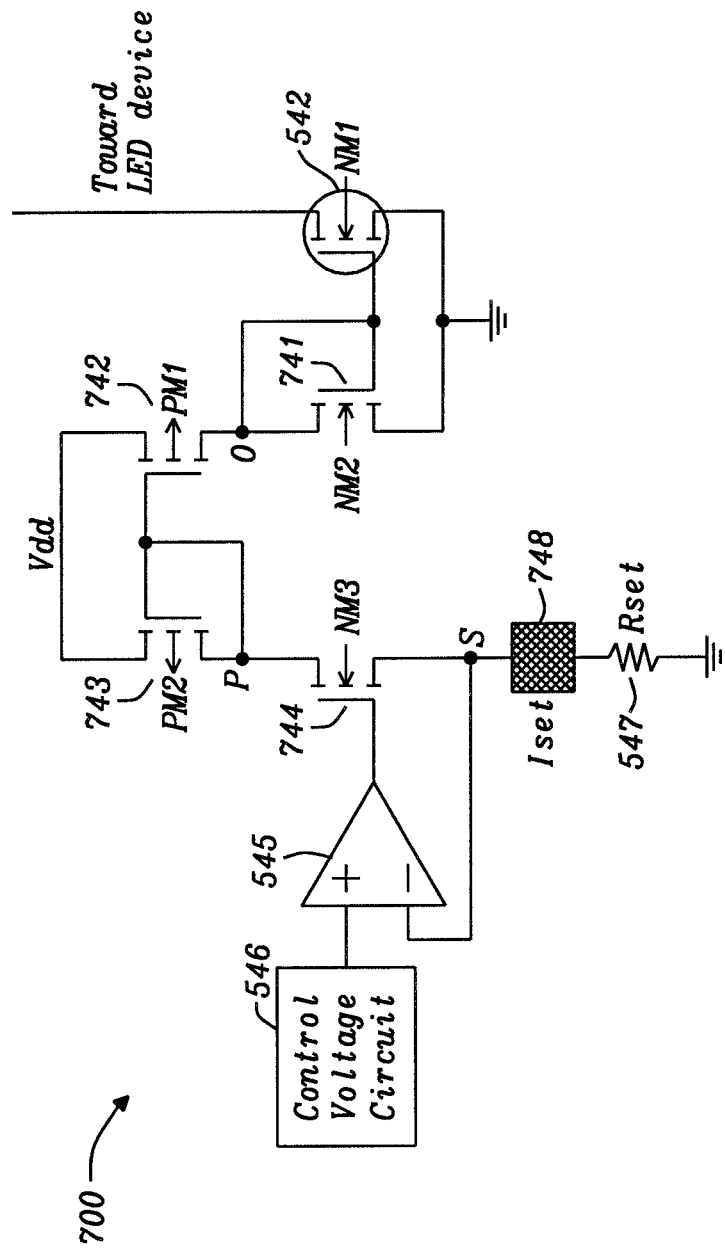
FIG. 7 is an example of a current regulator.

FIG. 7 shows an example of a current regulator 700 for use in the circuit of FIG. 5. Similar components to those illustrated in the circuit of FIG. 5 are labelled with the same reference numerals.

The current regulator 700 includes five transistors labelled NM1 542, NM2 741, PM1 742, PM2 743 and NM3 744. The transistors NM1 and NM2 form a first current mirror, and the transistors PM1 and PM2 form a second current mirror. For example, the transistors NM1 542 and NM2 741, may be provided by two N-channel transistors. The transistors PM1 742 and PM2 743 may be provided by two P-channel transistors.

The second current mirror 742, 743 is coupled to the first current mirror 542, 741 and to a current generator 748 for providing a current Iset setting the light output of the LED device.

The transistor NM1 542 has a first terminal, for example a drain terminal coupled to the LED device, a second terminal for example a gate terminal coupled to a gate terminal of the transistor NM2 741, and a third terminal, for example a source terminal coupled to the ground.

The transistor 741 has a first terminal, for example a gate terminal coupled to the gate terminal of the transistor 542, a second terminal, for example a source terminal coupled to ground and a third terminal, for example a drain terminal coupled to the transistor PM1 742 at node O. The gate terminal of transistor 741 is coupled its drain terminal at node O.

The source terminal of the transistor 742 and source terminal of the transistor 743 are both coupled to a rail voltage Vdd. The gate terminal of the transistor 742 and gate terminal of the transistor 743 are coupled together. The drain terminal of the transistor 742 is coupled to the drain terminal of the transistor NM2 741 at node O. The drain terminal of the transistor PM2 743 is coupled to the drain terminal of the transistor 744 at node P. The gate terminal of transistor 743 is coupled to its drain terminal at node P.

The comparator 545 has a first input for example a non-inverting input coupled to the control voltage circuit 546, a second input for example an inverting input coupled to the source terminal of the transistor 744 at node S, and an output coupled to the gate terminal of transistor 744. For example, the comparator 545 may be provided by an operating amplifier. A current generator 748 is coupled in series with the resistance 547 between node S and ground.

The control voltage circuit 546 provides a control voltage Vc which may be a fixed reference voltage. The set current Iset may be defined as the ratio of the control voltage Vc over the resistance Rset 547. The resistance Rset 547 may be a variable resistance, allowing the user to vary the LED current Iset. For example, if the control voltage circuit provides a voltage Vc=1V, and if Rset=1 ohm, the current Iset=1 A. By changing the value of Rset the user can vary the value of Iset and therefore control the light output of the LED device.

In operation, the circuit 700 is used to control an amount of current flowing through the LED device by controlling the transistor NM3 based on a feedback voltage at node S.

The current generator 748 may be adjusted to provide a current Iset. The current flowing through NM3 744 is mirrored across transistor NM1 542 via the second current mirror 742, 743 and the first current mirror 542, 741. When the transistor NM3 is switched ON (closed), the current through NM3 is equal to Iset, and the current flowing through NM1 542 is also equal to Iset. When the transistor NM3 is switched OFF (open), the current through NM3 is null and the current flowing through NM1 542 is null.

The circuit 700 could be modified such that a current flowing through the transistor NM3 is equal to N times a current flowing through NM1, in which N is an integer. This could be achieved by modifying the size of the transistors forming the first and the second mirrors.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A current regulator for use with a semiconductor light source, the current regulator comprising
    a first switch for receiving a first current flowing through the semiconductor light source;
    a controller circuit coupled to the first switch adapted to provide a second current proportional to the first current;
    wherein the controller circuit comprises a comparator coupled to a current mirror circuit via a second switch, the comparator being adapted to compare a feedback value with a control value and to provide a control signal to control the second switch,
    wherein the current mirror circuit comprises a first current mirror formed by the first switch and a third switch, and a second current mirror formed by a fourth switch and a fifth switch, wherein the fourth switch is directly connected to the third switch and wherein the second switch has a first terminal to receive the control signal, a second terminal connected to the fifth switch and a third terminal coupled to ground via a resistance, wherein the feedback value comprises a voltage across the resistance; and
    a current generator coupled in series with the second switch, the current generator being adapted to provide a setting current;
    wherein the current regulator is adapted to regulate the first current using the second current.

2. The current regulator as claimed in claim 1, wherein the second current is defined by a product of the first current and a constant, wherein the constant is an integer equal or greater than one.

3. The current regulator as claimed in claim 1, wherein the comparator is an operating amplifier provided with a feedback loop to form a closed-loop amplifier.

4. The current regulator as claimed in claim 1, wherein the feedback value is a function of the second current.

5. The current regulator as claimed in claim 1, comprising a voltage source adapted to provide a control voltage.

6. The current regulator as claimed in claim 1, wherein the setting current is a function of the resistance.

7. A driver for driving a semiconductor light source, the driver comprising
    an alternating power source coupled to a rectifier for providing an input voltage to the semiconductor light source, and
    a current regulator comprising a first switch for receiving a first current flowing through the semiconductor light source; and a controller circuit coupled to the first switch adapted to provide a second current proportional to the first current; wherein the controller circuit comprises a comparator coupled to a current mirror circuit via a second switch, the comparator being adapted to compare a feedback value with a control value and to provide a control signal to control the second switch, wherein the current mirror circuit comprises a first current mirror formed by the first switch and a third switch, and a second current mirror formed by a fourth switch and a fifth switch, wherein the fourth switch is directly connected to the third switch and wherein the second switch has a first terminal to receive the control signal, a second terminal connected to the fifth switch and a third terminal coupled to ground via a resistance, wherein the feedback value comprises a voltage across the resistance and wherein the current regulator is adapted to regulate the first current using the second current; wherein the current regulator comprises current generator coupled in series with the second switch, the current generator being adapted to provide a setting current.

8. A method of driving a semiconductor light source, the method comprising the steps of:
    providing a current regulator comprising a first switch for receiving a first current flowing through the semiconductor light source, and a controller circuit coupled to the first switch adapted to provide a second current proportional to the first current; wherein the controller circuit comprises a comparator coupled to a current mirror circuit via a second switch,
    comparing using the comparator a feedback value with a control value to provide a control signal to control the second switch,
    wherein the current mirror circuit comprises a first current mirror formed by the first switch and a third switch, and a second current mirror formed by a fourth switch and a fifth switch, wherein the fourth switch is directly connected to the third switch and wherein the second switch has a first terminal to receive the control signal, a second terminal connected to the fifth switch and a third terminal coupled to ground via a resistance, wherein the feedback value comprises a voltage across the resistance;
    wherein the current regulator comprises current generator coupled in series with the second switch, the current generator being adapted to provide a setting current, and
    regulating the first current using the second current.

9. The method as claimed in claim 8 wherein the second current is defined by a product of the first current and a constant, wherein the constant is an integer equal or greater than one.

10. The method as claimed in claim 8, wherein the feedback value is function of the second current.

11. The method as claimed in claim 8, wherein the control value is a control voltage; and wherein the feedback value is a feedback voltage.

12. The method as claimed in claim 8, wherein the comparator is an operating amplifier provided with a feedback loop to form a closed-loop amplifier.

* * * * *